United States Patent
McCormick et al.

(10) Patent No.: US 10,581,666 B2
(45) Date of Patent: Mar. 3, 2020

(54) METHOD AND APPARATUS FOR OPERATING NETWORK SLICES USING SHARED RISK GROUPS

(71) Applicants: William Carson McCormick, Ottawa (CA); Peter Ashwood-Smith, Gatineau (CA)

(72) Inventors: William Carson McCormick, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 15/465,012

(22) Filed: Mar. 21, 2017

(65) Prior Publication Data
US 2018/0278466 A1    Sep. 27, 2018

(51) Int. Cl.
*G01R 31/08* (2006.01)
*H04L 12/24* (2006.01)
(Continued)

(52) U.S. Cl.
CPC ...... *H04L 41/0654* (2013.01); *H04L 41/0896* (2013.01); *H04L 47/70* (2013.01);
(Continued)

(58) Field of Classification Search
USPC ........ 370/216, 217, 220, 221, 225, 242, 252
See application file for complete search history.

(56) References Cited

U.S. PATENT DOCUMENTS

| | | | |
|---|---|---|---|
| 2013/0007232 A1* | 1/2013 | Wang | H04L 63/0272 709/222 |
| 2013/0212285 A1* | 8/2013 | Hoffmann | H04L 12/4641 709/226 |

(Continued)

FOREIGN PATENT DOCUMENTS

| | | |
|---|---|---|
| CN | 105847035 A | 8/2016 |
| CN | 106506186 A | 3/2017 |
| EP | 3024184 A1 | 5/2016 |

OTHER PUBLICATIONS

ETSI GS NGP 001 V1.1.1 (Oct. 2016),Next Generation Protocols (NGP);Scenarios Definitions,dated Oct. 31, 2016.
(Continued)

*Primary Examiner* — Candal Elpenord
*Assistant Examiner* — Nguyen H Ngo

(57) ABSTRACT

A method and apparatus for instantiating network slices using connectivity and computing resources, is provided. Information regarding connectivity and computing resources for supporting network slices is used to identify shared risk groups. Each shared risk group includes those resources expected to be disabled by a common failure event. A first set of functions, such as virtual network functions, belonging to a network slice, is instantiated on a first subset of the resources. The union of all shared risk groups which include at least one of the first subset of resources is disjoint from the union of all shared risk groups which include at least one of a second subset of resources. The second subset of resources is allocated for instantiating a second set of functions which are redundant with the first set of functions. As such, redundant network slices and/or functions thereof can be provided which are robust to failure.

20 Claims, 10 Drawing Sheets

(51) Int. Cl.
*H04L 12/911* (2013.01)
*H04L 12/26* (2006.01)

(52) U.S. Cl.
CPC .......... *H04L 47/78* (2013.01); *H04L 41/0893* (2013.01); *H04L 43/0811* (2013.01)

(56) References Cited

U.S. PATENT DOCUMENTS

| | | | |
|---|---|---|---|
| 2015/0295761 A1* | 10/2015 | Wang | H04L 41/0806 709/222 |
| 2016/0191391 A1* | 6/2016 | Wood | H04L 47/125 370/235 |
| 2018/0034696 A1* | 2/2018 | Shahriar | G06F 9/45558 |
| 2018/0287894 A1* | 10/2018 | Senarath | H04L 41/0806 |
| 2018/0343567 A1* | 11/2018 | Ashrafi | H04L 67/10 |
| 2018/0351652 A1* | 12/2018 | Ashrafi | H04B 10/616 |

OTHER PUBLICATIONS

3GPP TR 22.891 entitled "Study on New Services and Markets Technology Enablers," Release 14, Version 1.2.0, Jan. 20, 2016.
Deep Medhi, A Unified Approach to Network Survivability for Teletraffic Networks: Models, Algorithms and Analysis, IEEE Transactions on Communications, Feb./Mar./Apr. 1994.
Rajagoplan and Saha, Internet Draft, "Link Bundling Considerations in Optical Networks" at https://tools.ieff.org/html/draft-rs-optical-bundling-00.
5g PPP white paper, EuCNC 2016 conference (Jul. 1st) from the following link: https://5g-ppp.eu/white-papers/ pp. 1 to 60.

* cited by examiner

METHOD AND APPARATUS FOR OPERATING NETWORK SLICES USING SHARED RISK GROUPS

FIELD OF THE INVENTION

The present invention pertains to the field of communication networks and in particular to a method and apparatus for operating network slices of communication networks using redundant components.

BACKGROUND

Using technologies, such as Network Function Virtualization (NFV), Network Slicing and Software Defined Networking (SDN), communications networks can be managed so that different subnetworks can be created, each of which is tailored to address demands from different customers. Network slicing allows an underlying resource pool to be segmented into multiple networks which are isolated from each other in terms of traffic and resource usage. The underlying resources, including connectivity resources and computing resources, can be partitioned amongst a number of different networks. By allowing for isolation of traffic and resource partitions networks, the slices can be sufficiently isolated that, to any entity within a slice, the slice itself is a complete network. By using NFV and other virtualization techniques, network functions can be placed throughout the network, and logical connections between the virtual entities can be defined. Changing or modifying the resources allocated to network functions or links between functions can be done dynamically to allow for a dynamic topology to suit the needs of the network. These flexible network architectures are of interest in various virtualized environments, for example in mobile networks, including both in the Core Network (CN) and possibly in the Radio Access Network (RAN), and are being studied as candidates for use in next generation mobile networks, such as so-called fifth generation (5G) networks.

Physical equipment used to operate network slices, for example by supporting the implementation of virtual network functions, is subject to failure and down time. Such physical equipment includes communication equipment, wired or optical communication links, computing equipment, storage, switches, power supplies, etc. However, it is desirable to create network services, delivered by network slices, which are robust to failure of such physical equipment.

Therefore there is a need for a method and apparatus for operating network slices that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for operating network slices using shared risk groups. In accordance with embodiments of the present invention, there is provided a method for instantiating one or more network slices using connectivity and computing resources. The method includes receiving information regarding connectivity and computing resources available for supporting network slices, including the one or more network slices being instantiated. The information used in identifying one or more shared risk groups, such that each shared risk group includes two or more of the connectivity and computing resources which are expected to be disabled by a same failure event which is associated with that shared risk group. In some embodiments, the method also includes identifying the shared risk groups. The method further includes directing a first set of functions to be instantiated on a first subset of the connectivity and computing resources. The first set of functions belongs to a network slice. The union of all shared risk groups which include at least one of the first subset of the connectivity and computing resources is disjoint from the union of all shared risk groups which include at least one of a second subset of the connectivity and computing resources. The second subset of the connectivity and computing resources is allocated for instantiating a second set of functions thereupon, and the second set of functions is redundant with the first set of functions.

In some embodiments, the method includes determining one or both of the first and second subsets of connectivity and computing resources, based at least in part on the identified shared risk groups. In some embodiments, the method includes directing the second set of functions to be instantiated on the second subset of connectivity and computing resources.

In accordance with embodiments of the present invention, there is provided an orchestrator (or other resource management) apparatus for instantiating one or more network slices using connectivity and computing resources. The apparatus includes at least a computer processor, a network interface, and a memory for storing instructions that when executed by the processor cause the resource manager apparatus to operate as follows. The apparatus is configured to receive, via the network interface, information regarding connectivity and computing resources available for supporting network slices including the one or more network slices being instantiated. The information used in identifying one or more shared risk groups, each of the one or more shared risk groups comprising two or more of the connectivity and computing resources which are expected to be disabled by a same failure event associated therewith. In some embodiments, the apparatus may identify the shared risk groups. The apparatus is further configured to direct, via the network interface, a first set of functions to be instantiated on a first subset of the connectivity and computing resources. The first set of functions belongs to a network slice. The union of all shared risk groups which include at least one of the first subset of the connectivity and computing resources is disjoint from the union of all shared risk groups which include at least one of a second subset of the connectivity and computing resources. The second subset of the connectivity and computing resources is allocated for instantiating a second set of functions thereupon, and the second set of functions is redundant with the first set of functions.

In some embodiments, the apparatus is configured to determine one or both of the first and second subsets of connectivity and computing resources, based at least in part on the identified shared risk groups. In some embodiments, the apparatus is configured to direct the second set of functions to be instantiated on the second subset of connectivity and computing resources.

In accordance with embodiments of the present invention, there is provided a method for instantiating a virtual entity in a network. The method includes by an orchestrator or other computer device: identifying a failure risk associated with a first underlying resource, and instructing instantiation of the virtual entity using a second underlying resource that is not subject to the identified failure risk. The first underlying resource is associated with another virtual entity in the network, such as a pre-existing virtual entity, and the virtual entity and the other virtual entity are at least partially redundant.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
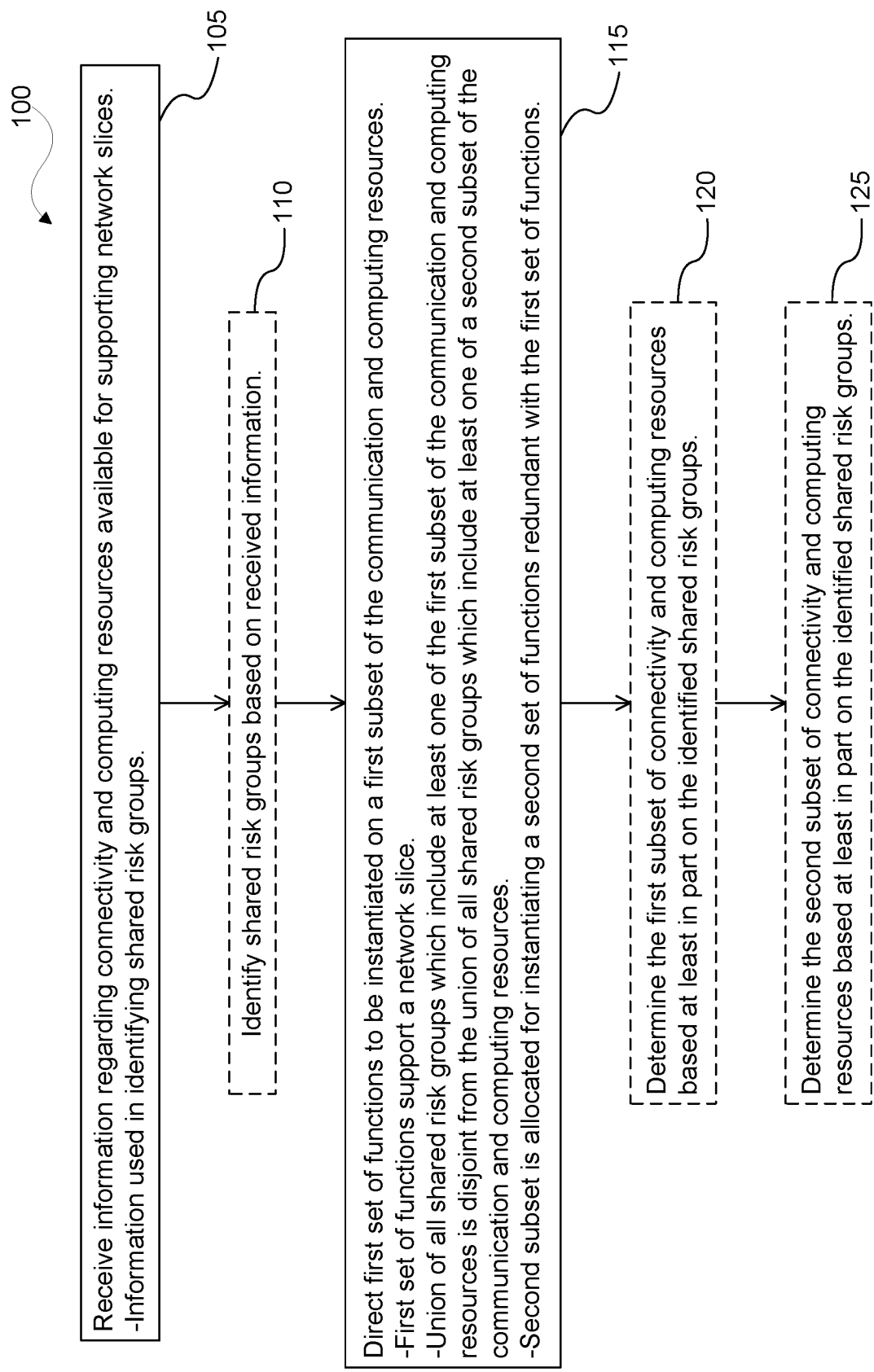
FIG. 1 illustrates a method for instantiating network slices, according to an embodiment of the present invention.

Embodiments of the present invention provide for a method and apparatus for allocating connectivity and computing resources for use in virtual environments supporting redundancy. In some embodiments, redundancy can be provided through the support of a redundant network slice (e.g. a network slice having network functions instantiated therein, designed to provide a network service redundant to a network service offered in another network slice), or through in-network or in-slice redundancy (e.g. the instantiation of network functions and logical links to provide a redundant service). The connectivity and computing resources, also referred to herein simply as "resources," can include configurable physical computing and/or communication equipment upon which functions can be instantiated. If these functions are dedicated to the network slice, they can be considered to be instantiated within the slice. As used herein, a connectivity resource upon which a function or virtual entity can be instantiated may be understood to be a resource with configurable capabilities, such as computing capabilities or transport capacities, supporting operation of an instantiated function or entity. A virtual router is an example of such a connectivity resource. Other connectivity resources, such as logical links, may not necessarily support functions instantiated thereon. Functions may also be described as belonging to a network slice in the sense that they reside and/or operate within the network slice. The functions may be virtual network functions (VNFs), and the connectivity and computing resources can be computing devices upon which the functions can be instantiated and connectivity devices or links used to connect the computing devices. In a virtualized environment, a single computing resource can be used as a platform upon which a plurality of VNFs can be instantiated. Logical links can be defined so that the instantiated VNFs are connected to each other. These logical links do not necessarily need to rely upon physical connectivity resources (e.g. a connectivity device or a link). A connectivity resource can be a switch, for example. A computing resource can be a standard high-volume server, or data processor such as a CPU or GPU, for example. The term virtual entity is used to encompass both virtual functions as well as logical links (which may not perform a function per se). A connectivity or computing resource can be an item of commercial-off-the-shelf computing or communication equipment that is reconfigurable to host a virtual network function, and typically can host multiple virtual network functions. The connectivity and computing resources may be located in one or more datacenters, in network nodes and/or at end user premises, for example.

A distinction can be made between connectivity and computing resources upon which a function can be instantiated, and supporting physical equipment which supports operation of such connectivity and computing resources. Supporting physical equipment can include power supplies, power lines, backup generators, wired or optical communication links, antennas, HVAC systems, and even physical infrastructure such as walls, roofs, and racks. VNFs may rely upon these resources, but are not instantiated upon them.

Many networks offer services that are designed to incorporate redundancy. Redundancy provides a number of potential advantages, not the least of which is the ability to provide failure recovery. For example, if two network functions are connected to each other using a single link, a failure of the link will result in failure of the service, however if the functions are connected using a pair of links (also referred to as redundant links), a failure of one of the links will not result in failure of the service. In such a scenario however, each of the functions still represents a single point of failure, in that failure of either function could result in failure of the service. To overcome this, redundant functions can be used. A pair of first functions can be connected to a pair of second functions (in some embodiments, each of the first functions can be connected to both of the second functions), so as to provide a fuller redundancy. In implementing redundancy, shared risk groups have been developed, as will be discussed in more detail below, to help identify the failure risks that can be included in the development of the redundancy.

In a virtualized environment, virtual network functions can be instantiated and virtual links can be created atop of generic resource pool. From within a network slice, instantiating pairs of virtual network functions and logical links is administratively far easier than the installation of redundant network functions and the corresponding links in a non-virtualized environment. However, there is a risk that the virtualization of two functions, intended to provide redundancy, will result in the instantiation of two VNFs upon the same computing resource. Similarly, establishing a pair of logical link between two instantiated functions may result in the creation of logical links within the same physical connectivity resource. This may provide the illusion of redundancy (and may still be useful from the perspective of load balancing), but it fails to provide redundancy in a form which protects against failure of the underlying resource.

A technical issue that may be encountered is that of effectively implementing redundancy in virtualized environments. It is not necessarily straightforward to provide virtualized environments which incorporate sufficient redundancy, where such provision is computationally and operationally efficient and effective. Because virtual entities within a network are instantiated upon a set of resources that may not be visible to an entity within a network slice, instantiating a virtual function or logical link (or other virtual entity) to provide redundant services may result in the instantiation of a virtual entity that shares the same risks of failure. A solution proposed according to embodiments of the present invention is to identify shared risk groups, and direct different redundant portions (e.g. different redundant virtual entities) of the virtualized environment to operate using resources belonging to different shared risk groups. This may include directing two different virtual entitites to operate using different resources. This may include, giving operating details of an existing portion of the virtualized environment, directing another redundant portion of the virtualized environment to operate using a different resource or set of resources.

According to embodiments of the present invention, at least two different (e.g. disjoint) subsets of the connectivity and computing resources are allocated for use in instantiating sets of redundant functions. A set of functions may include some or all of the virtual network functions instantiated within a network slice. The redundant sets of functions can belong to different respective redundant network slices or redundant portions of the same network slice, for example. The different subsets of the connectivity and computing resources are selected so that the resources in one subset belong to a first set of shared risk groups, while the resources in another subset belong to a second set of shared risk groups which is disjoint from the first set of shared risk groups. Shared risk groups are groups of connectivity and computing resources which are expected to be disabled by a common failure event associated with the shared risk group. The resources can be located in a data center of a 5G network, for example. Failure events can include but are not necessarily limited to failure of a piece of supporting physical equipment, a water ingress event, a physical damage event, a human error, and a malicious act.

Redundant sets of functions can refer to multiple sets of functions, one of which is able to provide service on behalf of another, in the event that the other is temporarily or permanently disabled. Redundant functions may include a primary and backup function, where the backup function does not provide any service until failure of the primary. A primary function or slice can be an "active" function or slice, while the backup function or slice can be a "protection" function or slice. In other embodiments, the redundant functions can each actively and concurrently provide service, but have extra capacity so that, if one function fails, the other can operate on its behalf, taking over its service load. Entire network slices or portions thereof can function to provide redundancy, as will be described further below.

According to embodiments of the present invention, redundant network slices, or portions thereof, can be made to operate on separate sets of physical infrastructure which do not share common vulnerabilities, or upon physical infrastructure with an acceptable level of common vulnerability. Thus, a single failure event which affects one set of redundant functions should not affect another, and therefore a service provided by a network slice which is affected by such a failure event can continue to be provided using the other set of redundant functions which are not affected by this failure event. By using redundancy, the availability of services offered by a network slice can be made higher than the availability of certain resources used to host functions making up the network slice. As such, higher-availability slices and/or services thereof can be provided using lower-availability data centers or other collections of equipment.

Embodiments of the present invention related to shared risk groups which are identified by considering the effects that the failure of a piece of supporting physical equipment can have on certain connectivity and computing resources. For example, if failure of a given piece of equipment would lead to outage of two resources, these two resources can be identified as belonging to the same shared risk group. Some embodiments may explicitly consider at least some physical equipment as belonging to the pool of connectivity and computing resources, noting that such physical equipment can be supported by other physical equipment (subject to failure) and hence can also belong to shared risk groups.

Having reference to FIG. 1, embodiments of the present invention provide for a method for instantiating network slices using connectivity and computing resources. The method 100 may be performed by a computer, such as a computing device performing network slice resource management functions. The method 100 includes receiving 105 information regarding connectivity and computing resources available for supporting network slices. The information is used in identifying one or more shared risk groups. Each of the one or more shared risk groups is defined as a set of two or more of the connectivity and computing resources which are expected to experience an outage due to a same failure event associated the shared risk group. In some embodiments, the set of all physical equipment instances which would likely experience an outage due to a given failure event are assigned to the same shared risk group. In some embodiments, the method includes identifying 110 the shared risk groups based on the received information. In other embodiments, the shared risk groups are identified by a companion process to the provided method, based on the received information. The companion process may be performed by a computer executing program instructions, for example. It should be understood that the process undertaken in identifying 110 the shared risk groups needs to be as exhaustive as defined by a level of comfort in the likelihood of a problem. In one such example, two data centers in different parts of a city may share a risk of a city-wide accident. If this risk is considered acceptable in view of the service being offered, then the risk group associated with such an event can be ignored. The method further includes directing 115 a first set of functions to be instantiated on a first subset of the connectivity and computing resources. The first set of functions belongs to a network slice. The first set of functions is defined such that the union of all shared risk groups which include at least one of the first subset of the connectivity and computing resources is disjoint from the union of all shared risk groups which include at least one of a second subset of the connectivity and computing resources. The second subset of the connectivity and computing resources is allocated for instantiating a second set of functions thereupon, and the second set of functions is redundant with the first set of functions. As such, the first set of functions is supported by resources which are subject to a different set of failure events than resources which support the second set of functions.

For further clarity, the received information is usable in identifying the one or more shared risk groups, in that it contains data that can be processed and analyzed do reliably identify these shared risk groups, as described above. For example, the information can include physical location information regarding the resources and/or the identities of supporting physical equipment upon which operation of each resource relies.

The union of shared risk groups corresponds to a set-theoretic union, i.e. in which an element belongs to the union of multiple sets if that element belongs to at least one of these multiple sets. The union of multiple sets is a set. Two sets overlap if at least one element belongs to both sets. Two sets are disjoint if they do not overlap (e.g. if they share no elements). For further clarity, a subset of connectivity and computing resources upon which a given set of functions is instantiated means all of the connectivity and computing resources which host functions belonging to the set.

In some embodiments, the method includes determining 120 the first subset of connectivity and computing resources based at least in part on the identified shared risk groups. In other embodiments, the first subset of resources is determined by a companion process. In some embodiments, the method includes also determining 125 the second subset of resources based at least in part on the identified shared risk groups, for example concurrently with the first subset. In further embodiments, the method includes directing 130 the second set of functions to be instantiated on the determined second subset of connectivity and computing resources. In other embodiments, the second subset of resources is predetermined and received as further input to the method.

Embodiments of the present invention are used in support of network slicing. Network slicing refers to a technique for separating different types of network traffic which can be used in reconfigurable network architectures, such as networks employing network function virtualization (NFV). A network slice (as defined in 3GPP TR 22.891 entitled "Study on New Services and Markets Technology Enablers," Release 14, Version 1.2.0, Jan. 20, 2016), is composed of a collection of logical network functions that supports the communication service requirements of particular use cases. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition. Multiple instances may correspond to redundant network slices, for example.

Network slices can be supported by a pool of (connectivity and computing) resources, which are configurable through virtualization approaches, such as NFV, in order to support the various logical functions of the network slices. The resources can include configurable computing and/or communication devices for example located in datacenters and/or geographically disposed at or topologically (from a network perspective) near radio communication equipment of the network. Selected resources can be configured to support functions of a particular network slice. The act of selecting resources is also referred to as allocating resources. In some embodiments, allocating resources for a network slice corresponds to placing a service chain graph onto a set of resources selected from the pool. In some embodiments, allocating resources for a network slice corresponds to selecting resources to be used in instantiating the functions of a service chain graph. The resources can be selected from one or more different datacenters, for example. The allocating of resources is performed at the time of initial network slice creation, but can also continue to be performed after network slice creation, in order to adjust the network slice on an as-needed basis.

The allocating of resources is performed based in part on the shared risk group requirements, but can also be performed based on the requirements of the network slice. For example, a function may be required to be located in a certain datacenter and/or on a connectivity and computing resource with a certain set of capabilities. Among a plurality of resources with the requisite capabilities, a resource can be allocated based on the shared risk group requirements.

Figure 2:
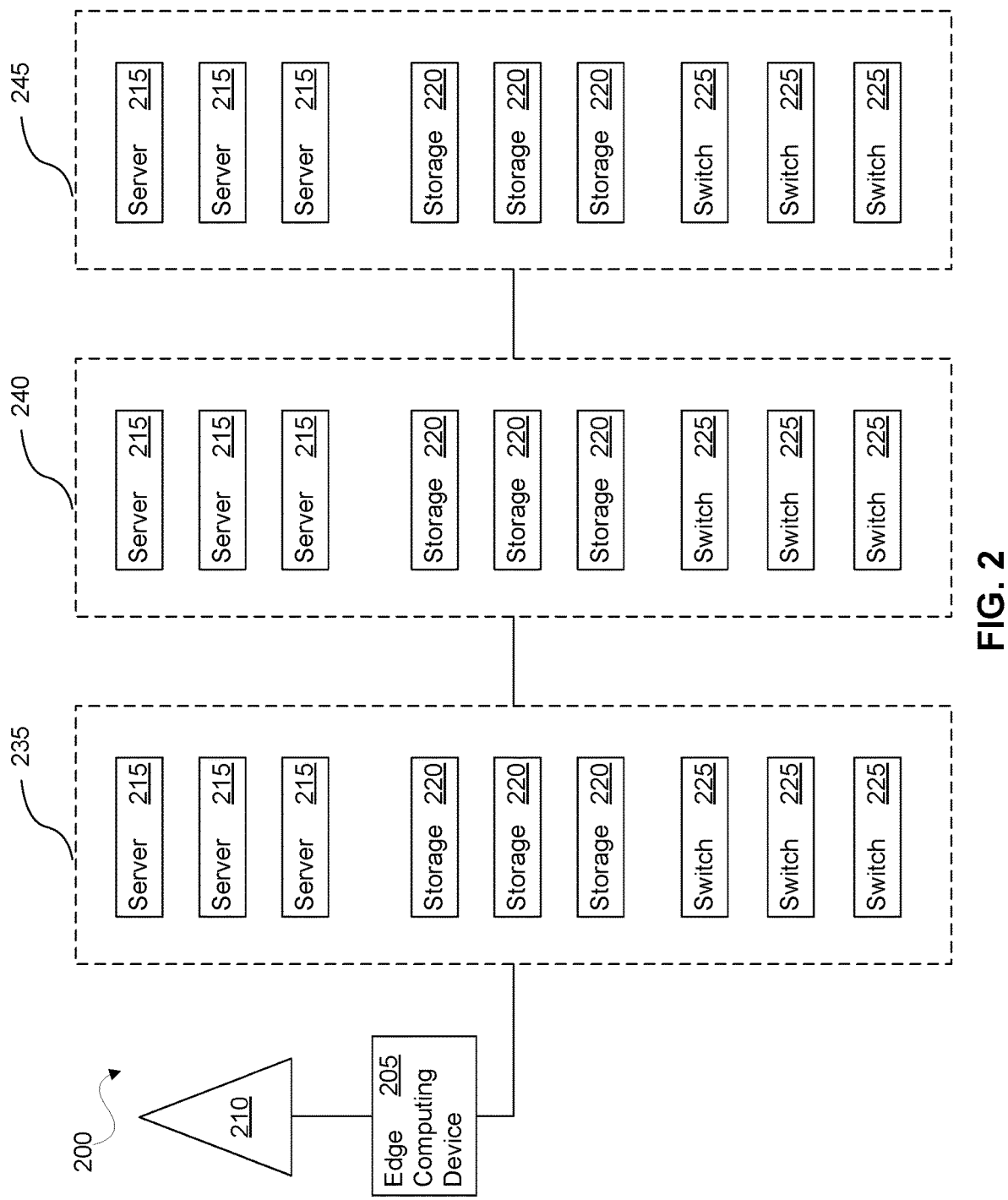
FIG. 2 illustrates available connectivity and computing resources, according to an embodiment of the present invention.

FIG. 2 illustrates an illustrative embodiment 200 collection of resources (e.g. computing resources) upon which functions supporting network slices can be instantiated, according to an example embodiment of the present invention. A resource may be a computing device 205 co-located with an access node 210, or a server 215, data storage device 220, switch 225 or other item of networking equipment located in a datacenter. An access node may be a base station, Wi-Fi™ wireless access point, NodeB, evolved NodeB, or other device which provides, to a mobile device or user equipment (UE), a point of access to a backhaul network, or a portion of such a device.

Possible datacenters include, for example, an access datacenter 235, a metropolitan datacenter 240, and a core network datacenter 245. The access datacenter 235 may be part of a cloud radio access network (C-RAN). The access datacenter 235 may support functions related to wireless protocols, such as communication and wireless media access protocols. The metropolitan datacenter 240 may hold functions applicable across a metropolitan-sized area, such as metro-level mobility management functions and local area caching functions. The core network datacenter 245 may hold functions applicable over the entire network, potentially spanning multiple metropolitan areas. The core and metropolitan datacenters may have overlapping functional areas.

Figure 3:
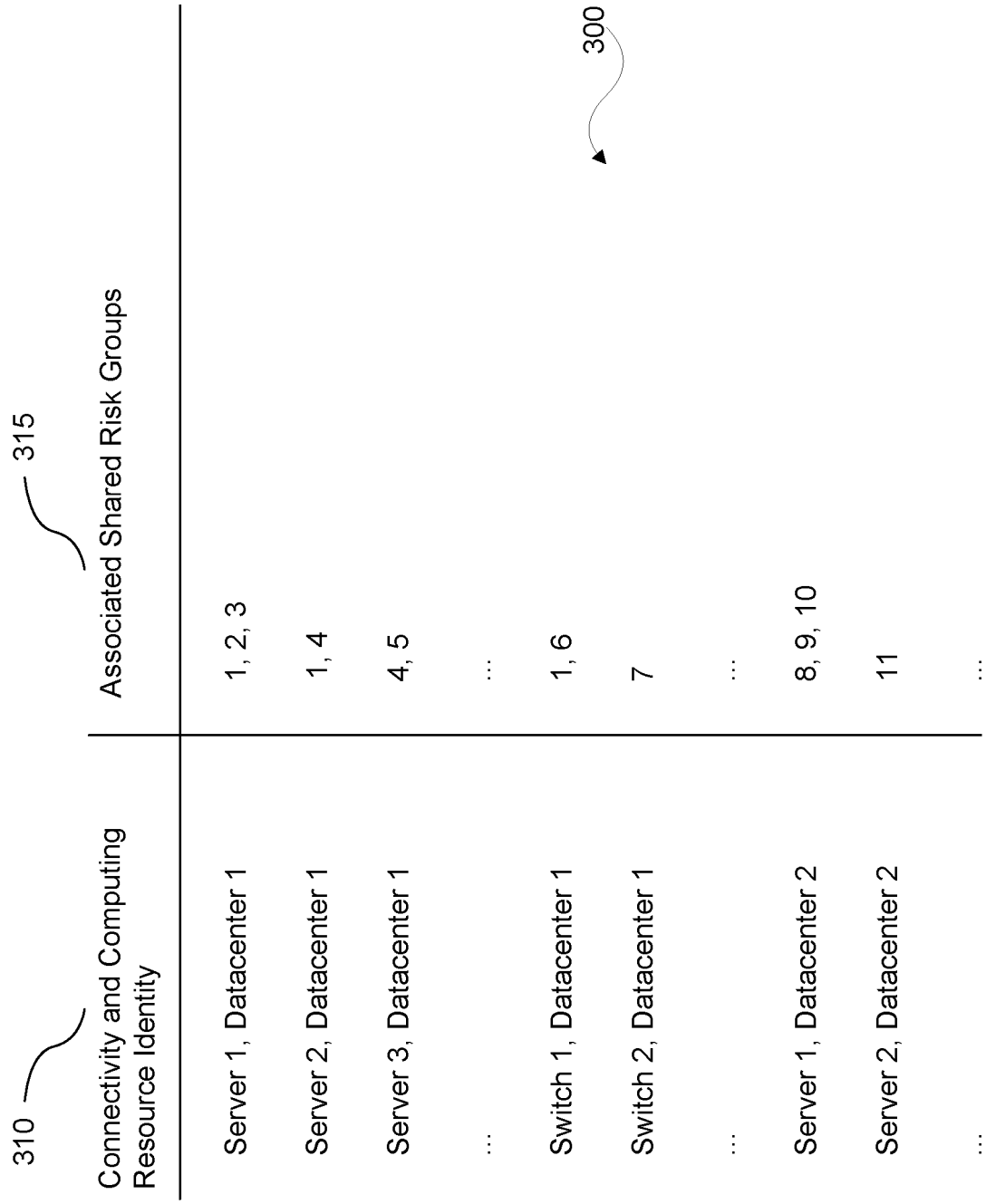
FIG. 3 illustrates a table associating connectivity and computing resources with shared risk groups, according to an example embodiment of the present invention.

Each resource in FIG. 2 may be associated with a set of one or more shared risk groups. Not all resources are necessarily associated with a shared risk group. For example, some resources may be supported by their own dedicated physical equipment. It should be understood that although such a resource may be associated with a risk group, its risk is not shared with other resources. FIG. 3 illustrates an example table 300 which lists identities 310 of connectivity and computing resources and shared risk groups 315 to which each of the listed resources belongs. In some embodiments, resources in different data centers sufficiently spaced apart could be unlikely to belong to the same shared risk group, due to geographic separation. Alternatively, the table may include a list of all shared risk groups, and, for each shared risk group, the identities of the resources belonging to the shared risk group. Various different data structures associating resources and corresponding shared risk groups may be created and used.

Identifying shared risk groups can be performed in a variety of ways. Equipment documentation can be used to identify potential failure events which could affect multiple resources. For example, datacenter layout documents can be used to identify multiple resources which share the same power supply, HVAC system, location, or communication link. Failure events can be based on a variety of physical risks, such as structural failures, electrical or mechanical equipment failures, weather events, vandalism, accidental damage, environmental changes, etc. Identification of shared risk groups can be automated by creating a process that identifies equipment which is subject to failure and upon which multiple resources rely for their operation.

In some embodiments, shared risk groups can be identified by constructing a data structure including entries indicating resources and the known potential failure events associated therewith. The data structure can then be processed in order to create a set of shared risk groups. Each shared risk group can be created by identifying two or more resources which are associated with a same failure event, and allocating these resources to the same shared risk group, which may be concurrently created with the identification of resources.

Shared risk groups may be used to abstract failure events away from physical characteristics. Network operations can then comprise provisioning and establishing redundant services or functions that do not share the same points of failure.

It is noted that each piece of physical equipment can potentially belong to multiple shared risk groups. Two pieces of physical equipment belonging to a given shared risk group can individually belong to two other shared risk groups.

Figure 4:
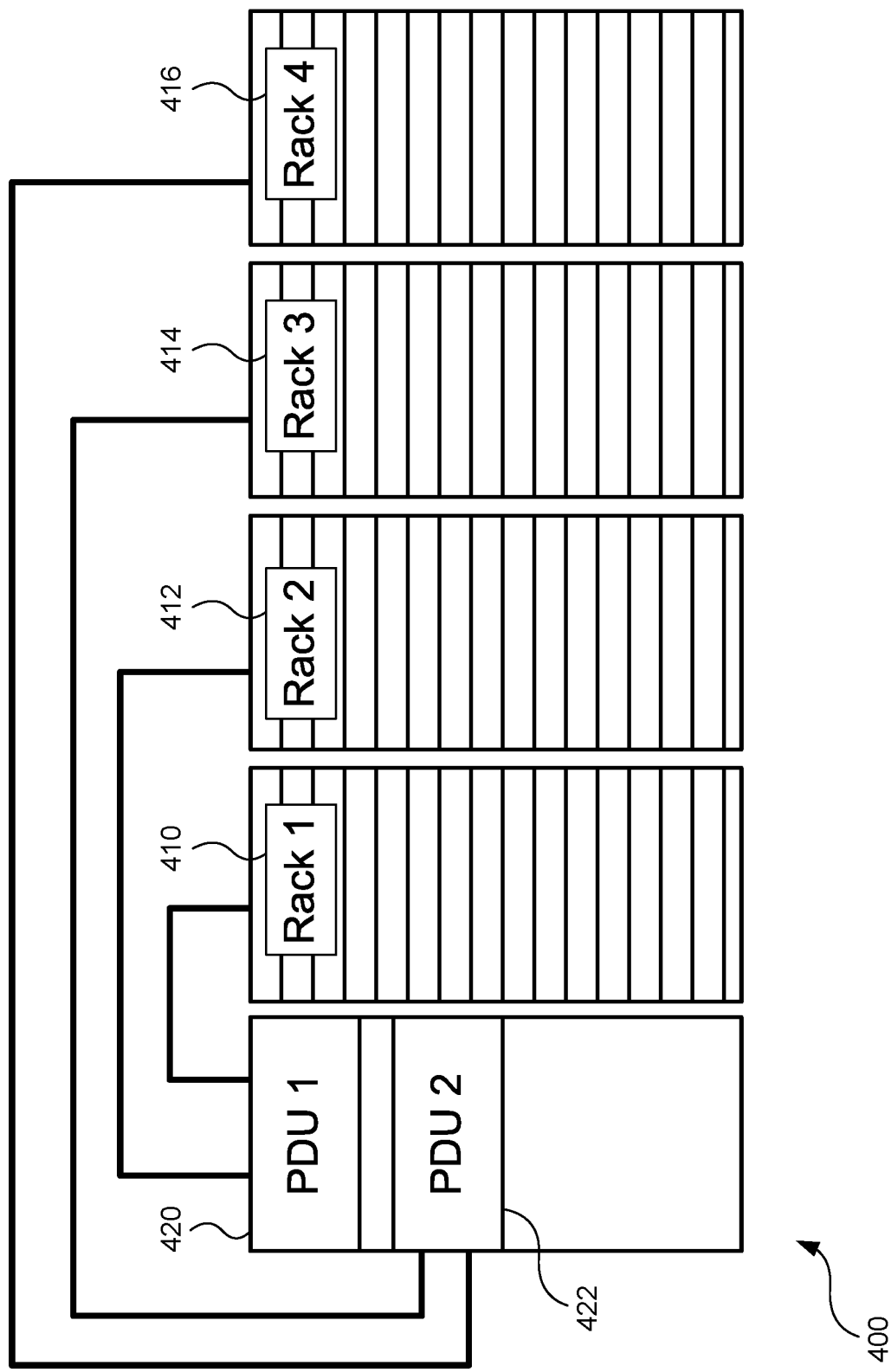
FIG. 4 illustrates an example of shared risk groups, according to an embodiment of the present invention.

FIG. 4 illustrates the concept of shared risk groups according to a simplified example embodiment of a computing system 400 of the present invention. Four device racks 410, 412, 414, 416 are provided, each holding multiple connectivity and computing resources, such as servers. The first two racks 410, 412 obtain power from a first power supply PDU 1 420, while the second two racks 414, 416 obtain power from a second power supply PDU 2 422. A first shared risk group is therefore defined which includes all devices on the first two racks 410, 412, and a second shared risk group is defined which includes all devices on the second two racks 414, 416. Now, consider a network slice having a number of virtual network functions (VNFs) and requiring high availability. Two copies of the network slice can be instantiated, such that VNFs of the first copy of the network slice are instantiated using resources in the first two racks 410, 412 but not the second two racks 414, 416; and VNFs of the second copy of the network slice are instantiated using resources in the second two racks 414, 416 but not the first two racks 410, 412.

According to some embodiments of the present invention, both a primary network slice and a secondary network slice are provided. The primary and secondary network slices can be created concurrently or one of the primary and secondary network slices can be pre-existing. The secondary network slice may fully duplicate all of the functions and capacity of the primary network slice. Alternatively, the secondary network slice may omit some non-critical functions of the primary network slice, and/or may have less capacity than the primary network slice.

In some embodiments, the secondary network slice is a backup network slice, which operates on standby (without handling a significant amount of traffic) until required. Alternatively, the secondary network slice may handle traffic concurrently with the primary network slice, but have sufficient excess capacity to take over operation of the primary network slice upon failure thereof.

The secondary network slice may operate as a dedicated backup network slice for a single primary network slice. Alternatively, the secondary network slice may operate as a shared backup network slice for a plurality of network slices, including the primary network slice. In some embodiments, a group of three or more network slices, including the primary and secondary network slices, may operate as mutually reinforcing backup network slices, such that, upon failure of one of the group of network slices, traffic handled by the failed network slice is instead handled by other members of the group of network slices.

In some embodiments, rather than full duplication of a network slice, only a portion of a network slice is duplicated. For example, critical functions of a network slice can be duplicated, while non-critical functions are not necessarily duplicated. As another example, functions of a network slice which rely on resources having a reliability below a predetermined absolute or relative threshold may be duplicated, while functions which rely on resources having a reliability above the predetermined threshold are not necessary duplicated.

Figure 5:
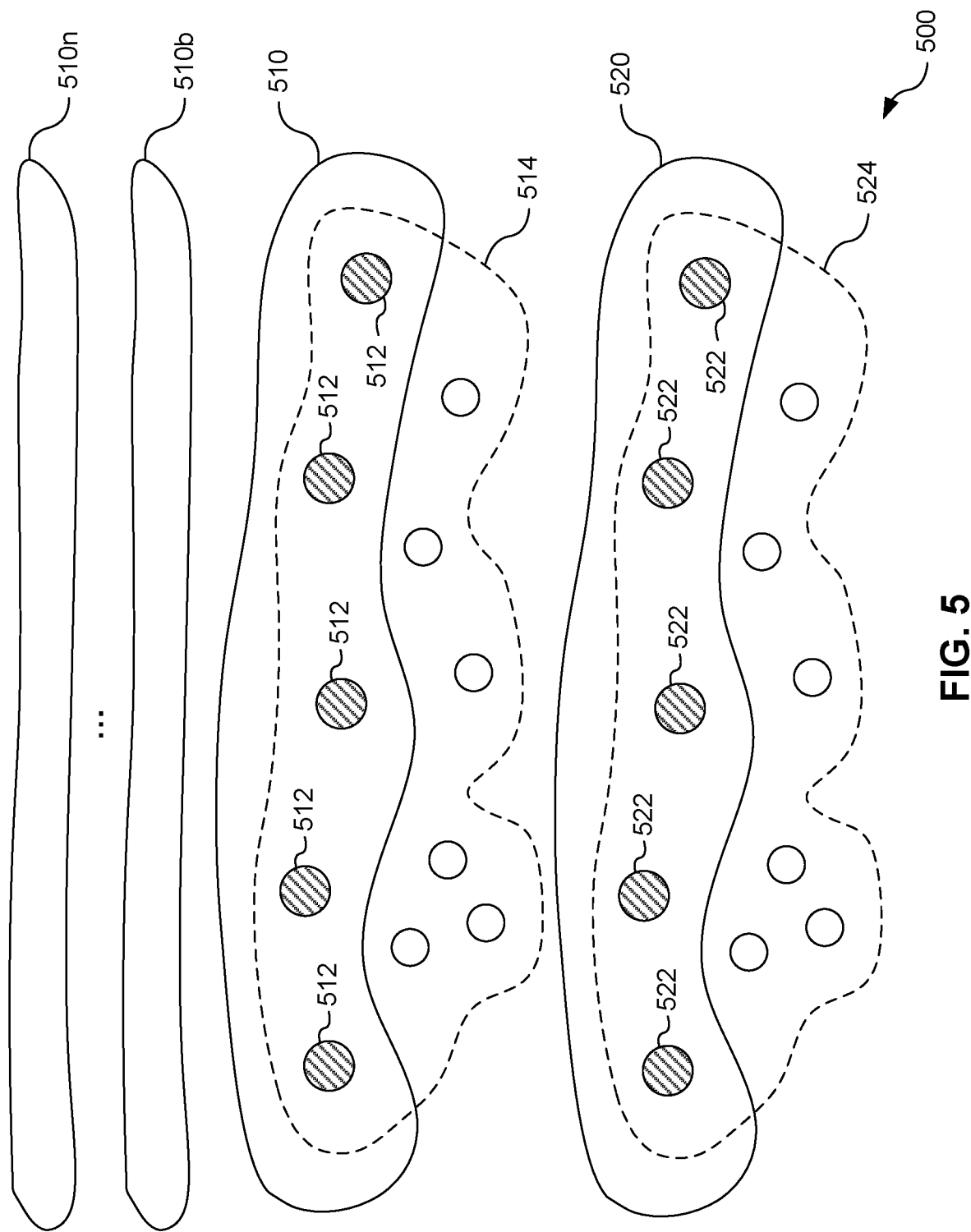
FIG. 5 illustrates network slices and shared risk groups, according to an example embodiment of the present invention.

According to some embodiments, and with reference to FIG. 5 which illustrates a logical view of a sliced network 500, a first network slice 510 can be provided along with a redundant network slice 520, such as a standby or concurrently active network slice with excess capacity. The redundant network slice 520 comprises functions instantiated on resources 522 which belong to a set 524 of shared risk groups which is disjoint from the set 514 of shared risk groups to which resources 512 used for the first network slice belong. The redundant network slice 520 can be dedicated for use in the event of failure of a single active network slice 510, or for use in the event of failure of any one of a plurality of N active network slices 510, 510b, . . . 510n.

Figure 6:
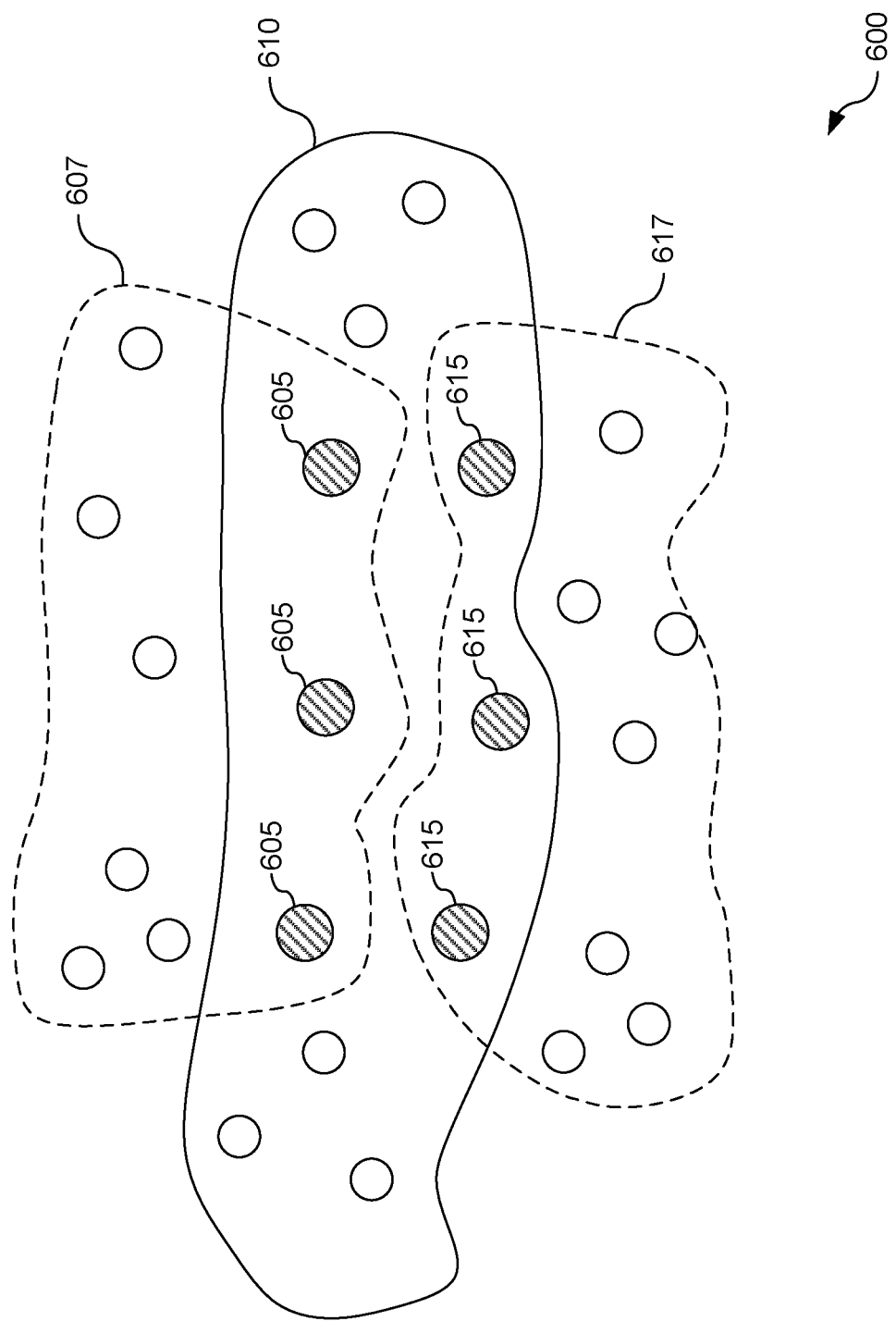
FIG. 6 illustrates a network slice with redundant functions and shared risk groups, according to another example embodiment of the present invention.

According to some embodiments, and with reference to FIG. 6, a network 600 may comprise a first set of functions belonging to a network slice 610 can be provided along with a set of redundant functions, which, in some further embodiments, also belong to the network slice 610. The first set of functions use resources 605 belonging to a first set 607 of shared risk groups. The set of redundant functions use resources 615 belonging to a second set 617 of shared risk groups. The first set 607 of shared risk groups is disjoint from the second set 617 of shared risk groups.

Embodiments of the present invention can be performed by a computing device operating as an orchestrator apparatus or other type of resource management apparatus. The resource manager may direct an orchestrator or other execution function to instantiate virtual network functions within designated configurable resources. The resource manager may operate to allocate resources for multiple network slices, on an as-needed basis, for example in response to requests or anticipated need. The virtual network functions can be instantiated to form service function chains which cooperate to provide part or all of the functionality of a network slice. VNFs in different redundant service function chains may be instantiated on devices belonging to different sets of shared risk groups.

Figure 7:
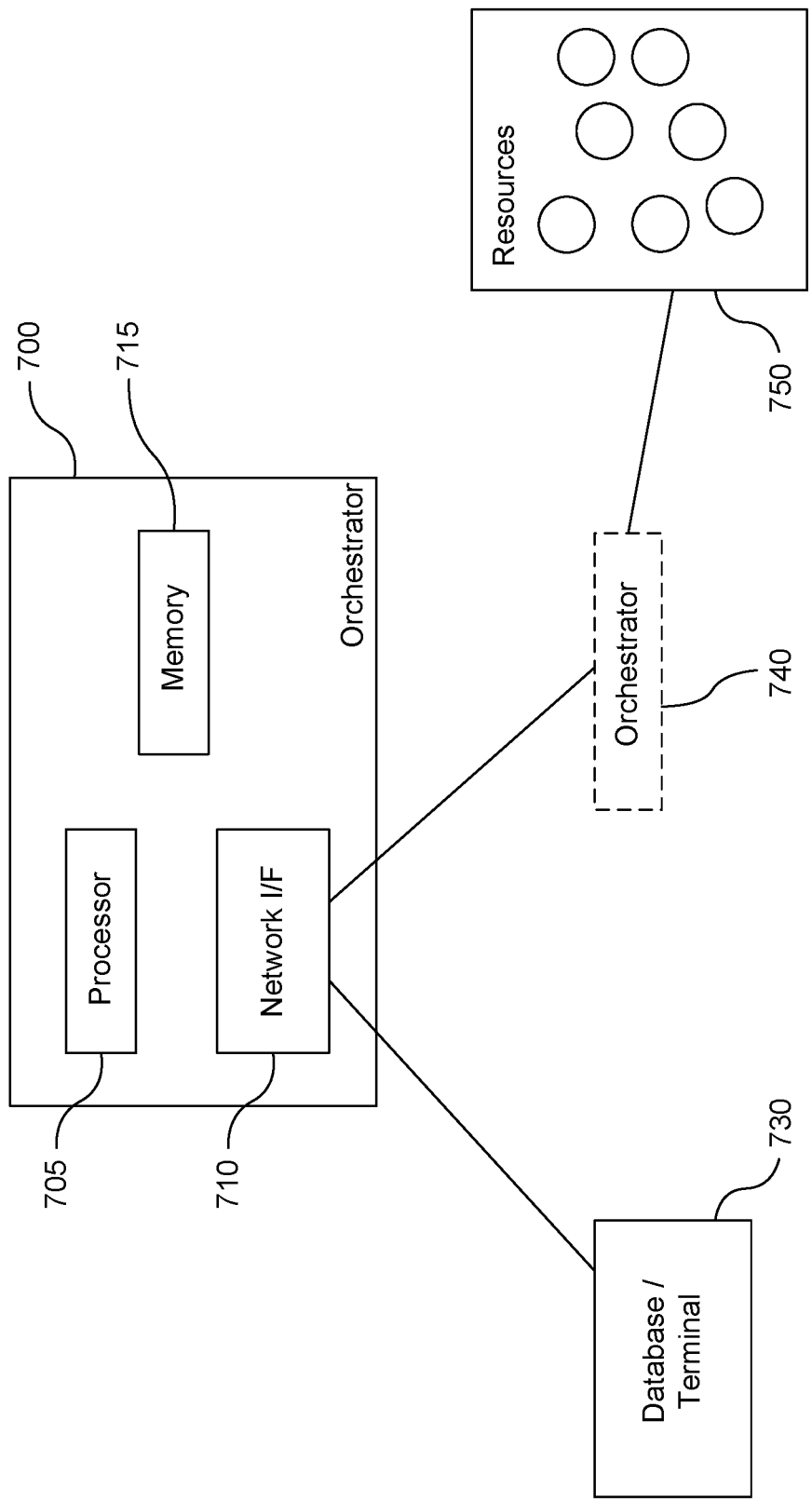
FIG. 7 illustrates an apparatus and associated devices, according to an embodiment of the present invention.

Having reference to FIG. 7, embodiments of the present invention provide for a resource management sensitive network virtualization orchestrator 700. The orchestrator 700 includes a processor 705, a network interface 710 and a memory 715 holding at least program instructions for execution by the processor. The apparatus 700 may optionally be provided using Network Function Virtualization or similar techniques. The orchestrator 700 can be provided as a single integral device or using different physical resources such as resources in a data network, in a data center, in a cloud resource center, or a combination thereof. The orchestrator 700 is configured to transmit and receive data packets using the network interface. The orchestrator 700 is configured to operate on the data packets using the processor 705 and/or 715 memory, for example to encapsulate the data packets, adjust the packet headers, and/or operate on the payload of the data packet in accordance with a service function.

The orchestrator 700 is configured in particular to receive, via the network interface 710, information regarding connectivity and computing resources available for supporting network slices. The information is used in identifying one or more shared risk groups, each of the one or more shared risk groups comprising two or more of the connectivity and computing resources which are expected to be disabled by a same failure event associated therewith. The information may be provided by a device 730 such as a database or computer terminal based on automatically or manually input data. Multiple such devices may provide parts of the total information. The orchestrator is further configured to direct, via the network interface 710, a first set of functions to be instantiated on a first subset of the connectivity and computing resources. In embodiments in which network virtualization is managed through the use of a hierarchy of orchestrators, an optional secondary orchestrator 740 (illustrated in dashed lines) or other networked such computing devices, may receive the directions and instantiate the functions accordingly by interaction with the connectivity and computing resources 750. Alternatively, the orchestrator 700 may interact directly with the connectivity and computing resources 750 to instantiate the functions. The first set of functions belongs to a network slice. As described above, the union of all shared risk groups which include at least one of the first subset of the connectivity and computing resources is disjoint from the union of all shared risk groups which include at least one of a second subset of the connectivity and computing resources. The second subset of the connectivity and computing resources is allocated for instantiating a second set of functions thereupon, the second set of functions being redundant with the first set of functions. In some embodiments, the processor 705 is configured, by executing program instructions in memory 715, to determine the shared risk groups and/or to determine one or both of the first and second subsets of the connectivity and computing resources.

The above-described operation of the apparatus may be performed by one or more functional modules, which include at least the microprocessor, network interface and memory operating in concert in a particular manner. The device may also perform other operations, such as conventional routing and forwarding operations.

Figure 8:
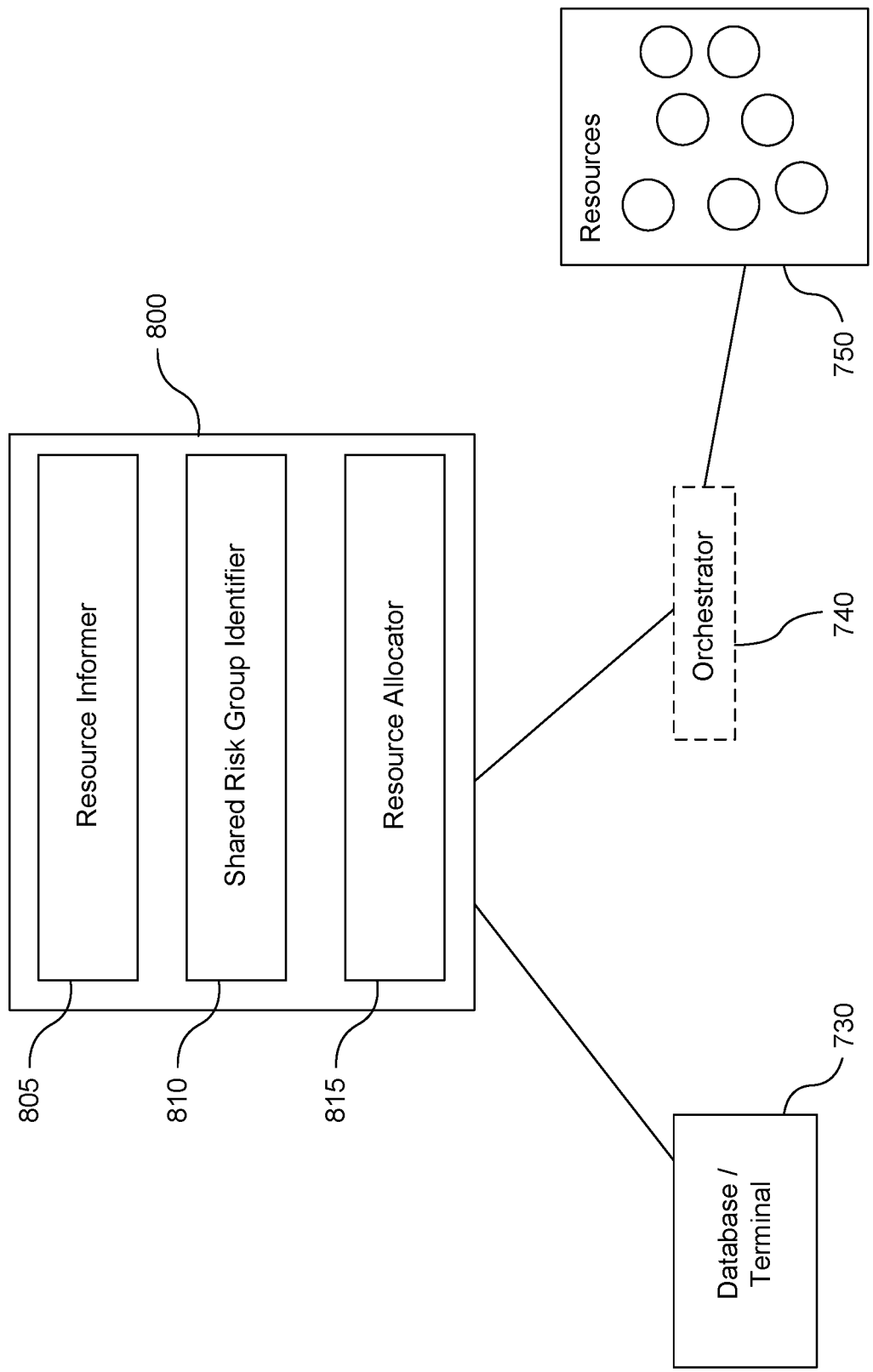
FIG. 8 illustrates an apparatus and associated devices, according to another embodiment of the present invention.

FIG. 8 illustrates an orchestrator 800 provided in accordance with an embodiment of the present invention. Orchestrator 800 is connected to the same components as the orchestrator 700 of FIG. 7 and may operate in a comparable manner. Further, the orchestrator 800 may include a processor, memory and network interface as illustrated in FIG. 7. The orchestrator 800 includes a resource informer 805 which is configured to receive, for example upon request, information regarding connectivity and computing resources available for supporting network slices. The information obtained by the resource informer 805 is usable in identifying shared risk groups. The information can be obtained from the database/terminal 730, for example. The orchestrator 800 may further include a shared risk group identifier 810 which is configured to receive information from the resource informer 810 and to process this received information to identify shared risk groups. The orchestrator 800 further includes a resource director 815 which is configured to direct sets of functions to be instantiated on selected subsets of the connectivity and computing resources, based at least partially on the identification of shared risk groups. The resource director 815 directs function instantiation by providing instructions to another entity, such as the orchestrator 740. Alternatively, the resource director may be a resource allocator which interacts directly with the resources 750 to perform the allocation.

In various embodiments, the resource informer 805 is configured to receive information regarding connectivity and computing resources available for supporting network slices. The information is used in identifying one or more shared risk groups, where each of the one or more shared risk groups comprises two or more of the connectivity and computing resources which are expected to be disabled by a same failure event associated therewith. The shared risk group identifier 810 is configured to use the information to identify these one or more shared risk groups by processing the information passed thereto by the resource informer. The resource director 815 is configured to direct a first set of functions to be instantiated on a first subset of the connectivity and computing resources. The first set of functions may belong to a network slice. The direction is such that the union of all shared risk groups which include at least one of the first subset of the connectivity and computing resources is disjoint from the union of all shared risk groups which include at least one of a second subset of the connectivity and computing resources. The second subset of the connectivity and computing resources is allocated for instantiating a second set of functions thereupon, the second set of functions being redundant with the first set of functions.

Various methods as disclosed herein may be implemented on one or more real or virtual computing devices, such as devices within a communication network control plane, devices operating in the data plane, or a combination thereof. Computing devices used to implement operations as described herein may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources and memory, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 9A:
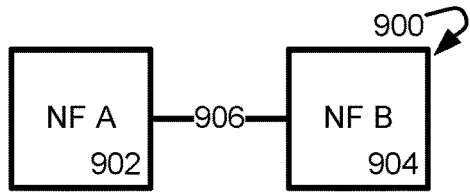
FIGS. 9A to 9D illustrate different types of redundancy that may be supported in different embodiments of the present invention.

FIGS. 9A to 9D illustrate different types of redundancy that may be supported in different embodiments of the present invention. FIG. 9A illustrates a configuration 900 of two network functions NF A 902 and NF B 904 connected by a link 906. Those skilled in the art will appreciate that this configuration does not illustrate redundant functions, although in some embodiments the processing resources allocated to either of the function 902 and 904 may be spread across a plurality of processors to provide a level of reliability and may be allocated storage resources that make use of physical redundancy. Link 906 is a logical link between the compute resources used to support the two NFs 900 and 904. Link 906 may route traffic over different paths through link aggregation, but typically this is done for the purpose of ensuring sufficient connectivity, not providing redundancy.

Figure 9B:
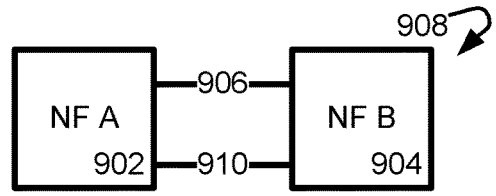

FIG. 9B illustrates a configuration 908 in which the NF A 902 and NF B 904 are connected by a pair of links 906 and 910. Links 906 and 910 are provided separately so that they can provide different paths between the two network functions. In embodiments of the present invention, the links 906 and 910 would be defined to take into account the available resources for creating the links, and then a selection of connectivity resources would be assigned to each link in such a manner that could allow for a minimization of the shared risk groups. It should be understood that in some embodiments there may not be a way to eliminate the shared risk groups (e.g. if NF A 902 is instantiated in a first data center, and NF B 904 is instantiated in a second data center, links 906 and 910 may share a geographic risk where they enter or exit the data centers) but the selection of resource may be done in a way that reduces the risks where possible.

Figure 9C:
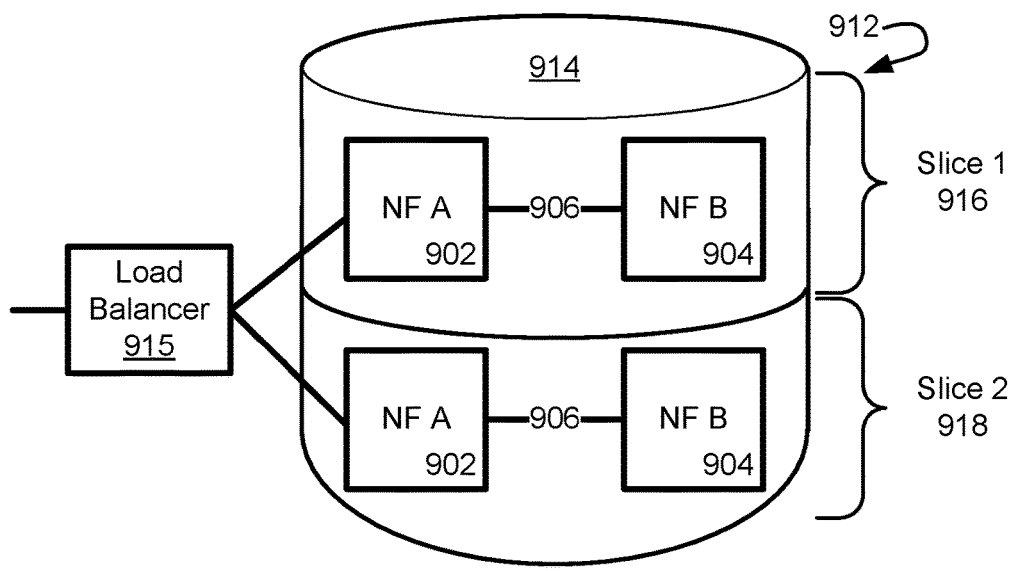

FIG. 9C illustrates a configuration 912 in which resources 914 are configured to provide Slice 1 916 and Slice 2 918. These slices are intended for the purposes of being redundant. Within each of Slice 1 916 and Slice 2 918 is NF A 902 connected to NF B 904 through link 906, as shown in FIG. 9A. Thus, Slice 1 916 may include one instance of each of NF A 902, NF B 904, and link 906, while Slice 2 918 includes another, separate instance of each of NF A 902, NF B 904, and link 906. Because each network slice is independent of other slices, from the perspective of either of Slice 1 916 and Slice 2 918, their functions are unique. To allow usage of the function chain within each slice, a load balancer 915 can be deployed outside the slices. In this manner, traffic can be routed to each function chain, and if a failure occurs in one slice, all traffic can be directed to the other slice. A network function such as an ETSI compliant Network Function Virtualization (NFV) MANagement and Orchestration (MANO) entity (not shown) can be used to instantiate the functions and links within each slice. In selecting the resources upon which to instantiate the functions, degrees of redundancy can be taken into account. In a first level of redundancy, the NF A 902 in each slice can be instantiated so that there are no shared risk groups (or a minimization of shared risk groups) as discussed above. The same can be done for the NF B 904 in each slice. In other embodiments a higher degree of redundancy is taken into account such that neither of the functions in either of the slices makes use of the same resources as a function in the other slice (e.g. NF A 902 in Slice 1 916 would not use compute resources having the same shared risk group as the compute resources used for either of NF A 902 or NF B 904 in Slice 2). Effectively, shared risks in redundancy can be considered on both the function and function chain level in some embodiments. Those skilled in the art will appreciate that in some scenarios instead of the elimination of redundancy, a minimization or reduction of the shared risks can be taken into account.

Figure 9D:
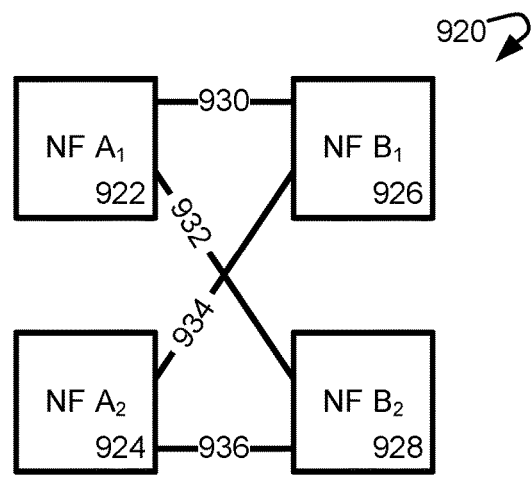

FIG. 9D illustrates an embodiment configuration 920 that may exist within a single network, or within a single network slice. A purpose for such a configuration may be to provide redundancy in a function chain within the same slice. Those skilled in the art will appreciate that configuration 920 may illustrate maximal redundancy, which may not be necessary for all embodiments. A pair of redundant network functions NF $A_1$ 922 and NF $A_2$ 924 can be instantiated upon sets of resources that do not share (or share within a comfort level threshold) common risk groups. Each of NF $A_1$ 922 and NF $A_2$ 924 are connected to each of NF $B_1$ 926 and NF $B_2$ 928. As with NF $A_1$ 922 and NF $A_2$ 924, each of NF $B_1$ 926 and NF $B_2$ 928 can be instantiated upon sets of resources that do not share (or share within a comfort level threshold) common risk groups. Links 930 and 932 can be created, or defined, in a manner that they do not use (or use within the comfort level threshold) resources with a shared risk. Links 934 and 936 can be defined in a similar fashion. In some embodiments, links 930 and 934 may be defined without a shared risk (or with shared risks within the comfort threshold), as may be links 936 and 932. With such a configuration, if a compute, storage, connectivity, power or other such resource defining a risk factor (along with other risk factors) is subject to failure, the function chain can continue to operate.

Reference was made above to a comfort level threshold. It will be understood by those skilled in the art that some shared or common risk groups may be acceptable while others will not be. This differentiation between acceptable and not acceptable risk groups defines a comfort level threshold. The comfort level threshold does not need to be a system wide factor, instead it may be defined by class of redundant element, but in some embodiments it can be unique to each redundant element pair. The comfort level threshold may be a function of the desired availability of a network slice or service being supported.

Those skilled in the art will appreciate that the methods discussed above have been phrased with consideration to the instantiation of pairs of redundant virtual entities, both network functions and logical links, so that identified risk factors to the infrastructure, upon which the virtual entities are instantiated, can be avoided. In some embodiments, assigning different sets of underlying resources to the different virtual entities may be done jointly as described above. In other embodiments, resources may be allocated to a first virtual entity, such as a virtual function, virtual machine, or logical link, and then a second virtual entity can be instantiated using a different set of resources to reduce, minimize or eliminate shared risks.

Figure 10:
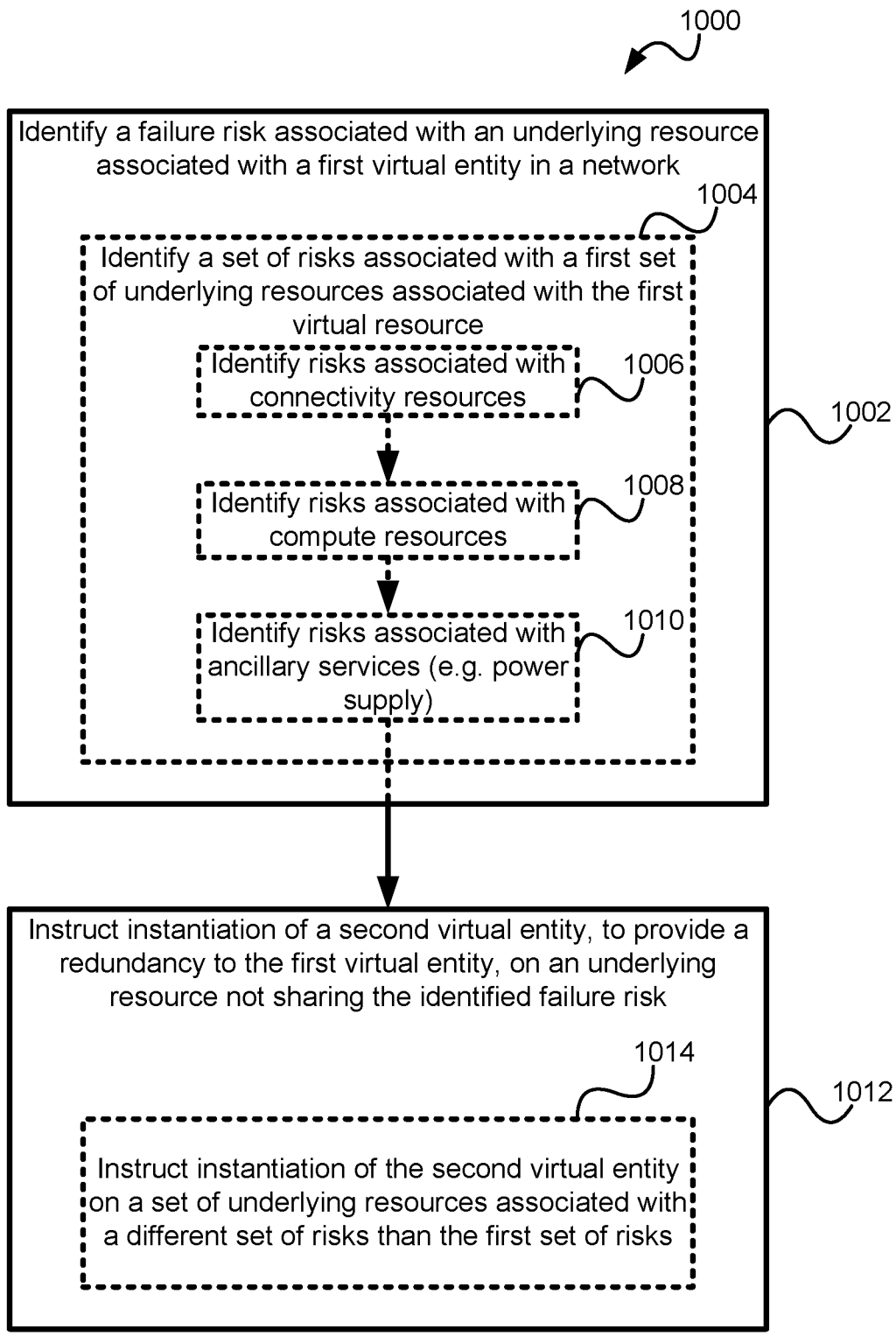
FIG. 10 is a flow chart illustrating a method for virtual entity instantiation, according to an embodiment of the present invention.

FIG. 10 is a flow chart illustrating one such method 1000. In step 1002 a failure risk associated with an underlying resource associated with a first virtual entity is identified. It should be understood that the virtual entity can be a network function, a logical link or even a collection of other virtualized entities (e.g. a function chain). In some embodiments, as illustrated in step 1004, a set of risks, which in some embodiments may form a risk group or a set of risk groups, associated with a first set of resources is identified. In various embodiments, this may include identifying risks associated with connectivity resources (step 1006) and identifying risks associated with compute resources (step 1008) which may include identifying related risks such as those associated with storage resources and other such resources generally considered to be related to computing resources. In other embodiments this may also include identifying risks associated with ancillary services such as power supply to a data center hosting a resource, or a risk to a cooling service (e.g. air conditioning) in such a data center. Those skilled in the art will appreciate that any of optional steps 1006 1008 and 1010 can be carried out alone or in combination with each other, and identification of other risks as described elsewhere in this disclosure can be carried out alone or in combination with the three illustrated risk factors.

This identification of a risk of failure may be done in conjunction with the instantiation of the first virtual entity, it may be performed as part of the planning process, or it may be carried out after the instantiation of the first virtual entity.

In step 1012, the instantiation of a second virtual entity is instructed. At least one resource upon which the second virtual entity is to be instantiated does not share the risk of failure identified in step 1002. If, in steps 1002 and 1004, a set of risks is identified, then it should be understood that in optional step 1014, the instruction to instantiate the second virtual entity is done so that the second virtual entity is instantiated on a set of resources having a different set of risks than the first set of risks.

Those skilled in the art will appreciate that the second entity is instantiated to provide a redundancy to at least part of the first virtual entity. In one example, both the first and second entities may be virtual functions. In other examples the first entity may be a function chain, and the second entity is a single function providing redundancy to a function in function chain of the first entity. It will also be understood that the elimination of risk is not required by the method 1000, instead at least one underlying resource used in the instantiation of the second function should be selected so that at least one risk of failure associated with the first virtual entity (or associated with its underlying resources) is not reproduced in the second virtual entity.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for instantiating a network slice using connectivity and computing resources, the method comprising, by an orchestrator:

receiving information regarding connectivity and computing resources available for supporting network slices including the network slice, the information used in identifying more than one shared risk group, each of the shared risk groups comprising two or more of the connectivity and computing resources sharing a common vulnerability;

directing a first set of functions to be instantiated on a first subset of the connectivity and computing resources, the first set of functions belonging to the network slice, the first subset of resources being associated with a first union of shared risk groups associated with the connectivity and computing resources within the first subset; and allocating a second subset of the connectivity and computing resources associated with a second set of functions redundant with the first set of functions, the second subset of resources being associated with a second union of shared risk groups associated with the connectivity and computing resources allocated to the second subset, the second union being sufficiently disjoint from the first union.

2. The method of claim 1, wherein common vulnerability corresponds to one of: failure of a power supply system; failure of a power distribution system; failure of a networking link; failure of a heating, ventilation and air conditioning system; a water ingress event; a human error event; and a malicious event.

3. The method of claim 1, wherein members of the first set of functions and the second set of functions are virtual network functions corresponding to a network function virtualization technology.

4. The method of claim 1, wherein the first set of functions belongs to the network slice and the second set of functions belongs to a second network slice which is redundant with the network slice.

5. The method of claim 1, wherein the first set of functions and the second set of functions are redundant sets of functions belonging to the network slice.

6. The method of claim 1, wherein one of the first set of functions and the second set of functions begins operating upon failure of another of the first set of functions and the second set of functions.

7. The method of claim 1, further comprising identifying the one or more shared risk groups based on the received information.

8. The method of claim 1, further comprising determining one or both of: the first subset of the connectivity and computing resources; and the second subset of the connectivity and computing resources, based at least in part on the one or more shared risk groups.

9. The method of claim 1, further comprising directing the second set of functions to be instantiated on the second subset of the connectivity and computing resources.

10. The method of claim 1, wherein the connectivity and computing resources include one or more of: a computing device co-located with an access node; a resource located in a datacenter; a server; a data storage device; and a programmable switch.

11. An orchestrator apparatus for instantiating a network slice using connectivity and computing resources, the orchestrator apparatus comprising: a computer processor, a network interface, and a memory for storing instructions that when executed by the processor cause the orchestrator apparatus to:

receive, via the network interface, information regarding connectivity and computing resources available for supporting network slices including the network slice, the information used in identifying more than one shared risk group, each of the shared risk groups comprising two or more of the connectivity and computing resources sharing a common vulnerability;

transmit instructions, via the network interface to direct a first set of functions to be instantiated on a first subset of the connectivity and computing resources, the first set of functions belonging to the network slice, the first subset of resources being associated with a first union of shared risk groups associated with the connectivity and computing resources within the first subset; and transmit instructions, via the network interface to allocate a second subset of the connectivity and computing resources associated with a second set of functions redundant with the first set of functions, the second subset of resources being associated with a second union of shared risk groups associated with the connectivity and computing resources allocated to the second subset, the second union being sufficiently disjoint from the first union.

12. The apparatus of claim 11, wherein common vulnerability corresponds to one of: failure of a power supply system; failure of a power distribution system; failure of a networking link; failure of a heating, ventilation and air conditioning system; a water ingress event; a human error event; and a malicious event.

13. The apparatus of claim 11, wherein members of the first set of functions and the second set of functions are virtual network functions corresponding to a network function virtualization technology.

14. The apparatus of claim 11, wherein the first set of functions belongs to the network slice and the second set of functions belongs to a second network slice which is redundant with the network slice.

15. The apparatus of claim 11, wherein the first set of functions and the second set of functions are redundant sets of functions belonging to the network slice.

16. The apparatus of claim 11, wherein one of the first set of functions and the second set of functions begins operating upon failure of another of the first set of functions and the second set of functions.

17. The apparatus of claim 11, the apparatus further configured to identify the one or more shared risk groups based on the received information.

18. The apparatus of claim 11, the apparatus further configured to determine one or both of: the first subset of the connectivity and computing resources; and the second subset of the connectivity and computing resources, based at least in part on the one or more shared risk groups.

19. The apparatus of claim 11, the apparatus further configured to direct the second set of functions to be instantiated on the second subset of the connectivity and computing resources.

20. The apparatus of claim 11, wherein the connectivity and computing resources include one or more of: a computing device co-located with an access node; a resource located in a datacenter; a server; a data storage device; and a programmable switch.

* * * * *